(12) United States Patent
Salaverry

(10) Patent No.: US 8,913,033 B2
(45) Date of Patent: Dec. 16, 2014

(54) PROJECTED CAPACITIVE TOUCH SENSOR CIRCUIT

(75) Inventor: Ricardo Salaverry, San Jose, CA (US)

(73) Assignee: ELO Touch Solutions, Inc., Menlo Park, CA (US)

(*) Notice: Subject to any disclaimer, the term of this patent is extended or adjusted under 35 U.S.C. 154(b) by 351 days.

(21) Appl. No.: 13/482,665

(22) Filed: May 29, 2012

(65) Prior Publication Data

US 2013/0321323 A1 Dec. 5, 2013

(51) Int. Cl.
*G06F 3/044* (2006.01)
*G01R 27/26* (2006.01)

(52) U.S. Cl.
USPC .......................... 345/174; 345/156; 345/173

(58) Field of Classification Search
CPC .......... G06F 3/041; G06F 3/044; G06F 3/045
USPC ................. 345/173–178; 178/18.06
See application file for complete search history.

(56) References Cited

U.S. PATENT DOCUMENTS

| | | | |
|---|---|---|---|
| 4,639,720 A | 1/1987 | Rympalski et al. | |
| 4,806,709 A | 2/1989 | Evans | |
| 6,970,126 B1 | 11/2005 | O'Dowd et al. | |
| 7,504,977 B2* | 3/2009 | Doorenbos et al. | 341/143 |
| 7,863,966 B1* | 1/2011 | Chuang et al. | 327/517 |
| 2011/0084857 A1 | 4/2011 | Marino et al. | |
| 2011/0090173 A1* | 4/2011 | Huang et al. | 345/174 |
| 2011/0115717 A1* | 5/2011 | Hable et al. | 345/173 |
| 2011/0163992 A1 | 7/2011 | Cordeiro et al. | |
| 2011/0261006 A1 | 10/2011 | Joharapurkar et al. | |
| 2012/0075245 A1 | 3/2012 | Chang et al. | |

OTHER PUBLICATIONS

Baxter, Larry K., "Capacitive Sensors: Design and Applications," IEEE Press, 1997, 4 pages.
Ko, Seunghoon et al., "Low Noise Capacitive Sensor for Multi-touch Mobile handset's applications," IEEE Asian Solid-State Circuits Conference, Nov. 8-10, 2010/Beijing, China, 4 pages.

* cited by examiner

*Primary Examiner* — Andrew Sasinowski
(74) *Attorney, Agent, or Firm* — Alston & Bird LLP

(57) ABSTRACT

A method for measuring a mutual capacitance between electrodes of a touch sensitive device includes generating a periodic pulse, communicating the pulse to a drive electrode, and measuring a mutual capacitance between the drive electrode and a sense electrode at a point of intersection between the drive electrode and the sense electrode. Measuring further includes continuously integrating a sense signal from the sense electrode to thereby generate an integrated sense signal, periodically sampling the integrated sense signal at a first time that is prior to a falling edge of the pulse, and at a second time that is prior to a rising edge of the pulse to thereby sample a maximum value and a minimum value of the integrated sense signal, digitizing the maximum value and the minimum value, and determining a difference between the maximum value and the minimum value to thereby determine a mutual capacitance between the drive electrode and the sense electrode.

20 Claims, 3 Drawing Sheets

PROJECTED CAPACITIVE TOUCH SENSOR CIRCUIT

BACKGROUND

1. Field

The subject matter disclosed herein relates generally to capacitive touch sensors, and more particularly to a projected capacitive touch sensor circuit for detecting a touch location.

2. Description of Related Art

Projected capacitive touch sensors typically include a substrate upon which electrodes for sensing a touch location are disposed. The substrate may be a durable glass having high optical transparency for viewing images displayed by an underlying display device that displays images such as graphical buttons and icons. When a user touches, for example with a finger or a stylus, on the outer surface of the substrate at a location corresponding to a desired selection displayed on the display device, the location is determined by sensing changes in capacitances between the electrodes.

In some projected capacitive touch sensors, the electrodes are arranged in rows of electrodes and columns of electrodes. The rows and columns are electrically isolated from one another via an insulating layer. A touch location is determined by driving electrodes of a first orientation (e.g., the column electrodes or drive electrodes) with a square wave signal (i.e., drive pulse). Sense circuitry coupled to the electrodes of the other orientation (e.g., the horizontal electrodes or sense electrodes) measures current flow between the electrodes due to mutual capacitive coupling that exists between the column electrodes and the row electrodes. The amount of current flow is directly proportional to the value of the mutual capacitance and therefore facilitates the determination of the mutual capacitance. The mutual capacitance between the intersection of a column electrode and a row electrode will change when a user touches the substrate in the vicinity of the intersection.

Typical sense circuits for measuring the mutual capacitance operate by repetitively switching the sense electrodes to an input of an analog integrator circuit, which includes an amplifier with a feedback circuit that includes a capacitor that couples the amplifier output to the amplifier input. Such a circuit typically comprises a switch that couples the input of the integrator to the sense electrode just before each falling edge of the drive pulse that drives the drive electrodes and than uncouples just before each rising edge so as to integrate only signals of one polarity. The output of the integrator is then digitized and the digitized value is utilized to determine whether and where a touch has occurred.

However, the relative magnitudes of parasitic capacitances of the switch at the input of the integrator are large in comparison with the mutual capacitances between electrodes, which is typically measured in fractions of a picofarad. To overcome the effects caused by the parasitic capacitances, a number of integration cycles are performed before a touch location may accurately be determined. For example, the integrator may integrate the signal measured on the sense electrode over two hundred or more cycles, which could take 1 ms or more for a drive pulse with a frequency of 200 kHz. The length of time to make a determination increases with the number of electrodes that must be measured, which may affect user experience for relatively large displays that typically have a large number of electrodes to measure, relative to smaller pCap displays used in mobile devices.

BRIEF DESCRIPTION

In a first aspect, a circuit for measuring a mutual capacitance between electrodes disposed on a substrate includes a drive circuit configured to generate a periodic pulse and to communicate the pulse to a drive electrode, and a sense circuit configured to measure a mutual capacitance between the drive electrode and a sense electrode at a point of intersection between the drive electrode and the sense electrode. The sense circuit includes an integrator circuit with an input section that is in continuous electrical communication with the sense electrode and a switch circuit with an input in electrical communication with an output of the integrator circuit and an output in electrical communication with a analog-to-digital converter (ADC). The switch operates to momentarily communicate an output signal of the integrator circuit to the analog-to-digital converter at a first time that is prior to a falling edge of the pulse, and at a second time that is prior to a rising edge of the pulse to thereby sample a maximum value and a minimum value of the output signal. The sense circuit also includes computational logic configured to determine a difference between the maximum value and the minimum value to thereby determine a mutual capacitance between the drive electrode and the sense electrode.

In a second aspect, a method for measuring a mutual capacitance between electrodes disposed on a substrate includes generating a periodic pulse, communicating the pulse to a drive electrode, and measuring a mutual capacitance between the drive electrode and a sense electrode at a point of intersection between the drive electrode and the sense electrode. Measuring further includes continuously integrating a sense signal from the sense electrode to thereby generate an integrated sense signal, periodically sampling the integrated sense signal at a first time that is prior to a falling edge of the pulse, and at a second time that is prior to a rising edge of the pulse to thereby sample a maximum value and a minimum value of the integrated sense signal, digitizing the maximum value and the minimum value, and determining a difference between the maximum value and the minimum value to thereby determine a mutual capacitance between the drive electrode and the sense electrode.

In a third aspect a touch sensitive system includes a substrate having disposed thereon a plurality of drive electrodes and a plurality of sense electrodes and a circuit for determining a location of a touch. The circuit includes a drive circuit configured to generate a periodic pulse and to communicate the pulse to a drive electrode, and a sense circuit configured to measure a mutual capacitance between the drive electrode and a sense electrode at a point of intersection between the drive electrode and the sense electrode. The sense circuit includes an integrator circuit with an input section that is in continuous electrical communication with the sense electrode and a switch circuit with an input in electrical communication with an output of the integrator circuit and an output in electrical communication with a analog-to-digital converter. The switch operates to momentarily communicate an output signal of the integrator circuit to the analog-to-digital converter at a first time that is prior to a falling edge of the pulse, and at a second time that is prior to a rising edge of the pulse to thereby sample a maximum value and a minimum value of the output signal. The sense circuit also includes computational logic configured to determine a difference between the maximum value and the minimum value to thereby determine a mutual capacitance between the drive electrode and the sense electrode.

BRIEF DESCRIPTION OF THE DRAWINGS

The accompanying drawings are included to provide a further understanding of the claims, are incorporated in, and constitute a part of this specification. The detailed description

DETAILED DESCRIPTION

The embodiments described below overcome the problems discussed above by utilizing a circuit capable of measuring the mutual capacitance between drive and sense electrodes with no analog switching between the sensor electrodes and the first gain element in the receiving circuitry during the mutual capacitance measurement.

Figure 1:
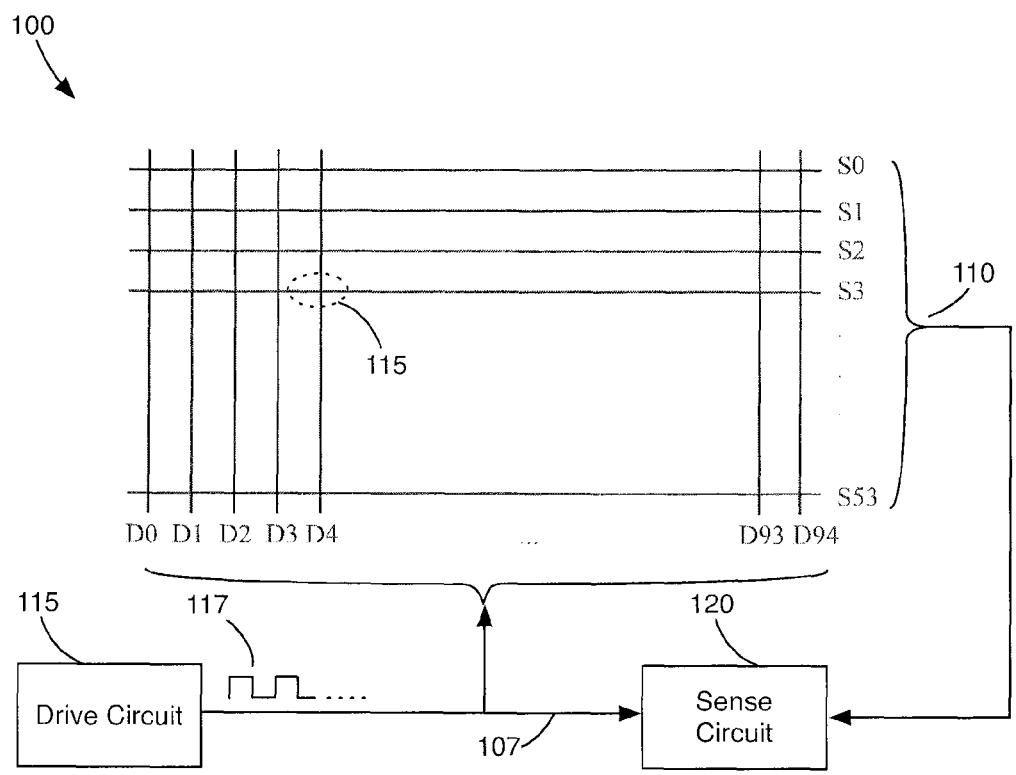
FIG. 1 is an exemplary schematic representation of electrodes that may be disposed on a substrate of a capacitive touch sensitive device.

FIG. 1 is an exemplary schematic representation of electrodes (105, 110) that may be disposed on a substrate of a capacitive touch sensitive device 100. The electrodes (105, 110) include vertically arranged drive electrodes 105 and horizontally arranged sense electrodes 110. The orientation and number of electrodes shown is only exemplary. While for clarity of presentation electrodes in FIG. 1 are drawn as simply straight lines, it is understood that there are many options for actual electrodes geometry including bars of finite width, connected serious of diamond shaped pads, etc.

The drive electrodes 105 are coupled to a drive circuit 115 that is configured to generate a periodic signal, such as an oscillator that produces a square wave 117. The drive circuit 115 may drive all the drive electrodes 105 simultaneously or separately via a multiplexing circuit. In one implementation, the frequency of the drive signal is about 200 kHz. However, it is understood that other drive frequencies may be utilized. For example, the drive signal may have a frequency between 50 kHz and 500 kHz, or a different range.

The sense electrodes 110 are arranged perpendicularly with respect to the drive electrodes 105 to provide various points of intersection 115 between the electrodes (105, 110). Each intersection 115 of a sense electrode 110 and a drive electrode 105 is a point at which the mutual capacitance may be measured and, therefore, the presence of a touch determined. The sense electrodes 110 are coupled to a sense circuit 120 configured to measure the mutual capacitance and determine whether a touch has occurred at a given intersection 115. As indicated by the arrow 107 from drive circuit 115 to sense circuit 120, drive signal timing information is made available to sense circuit 120 for synchronization purposes.

Figure 2:
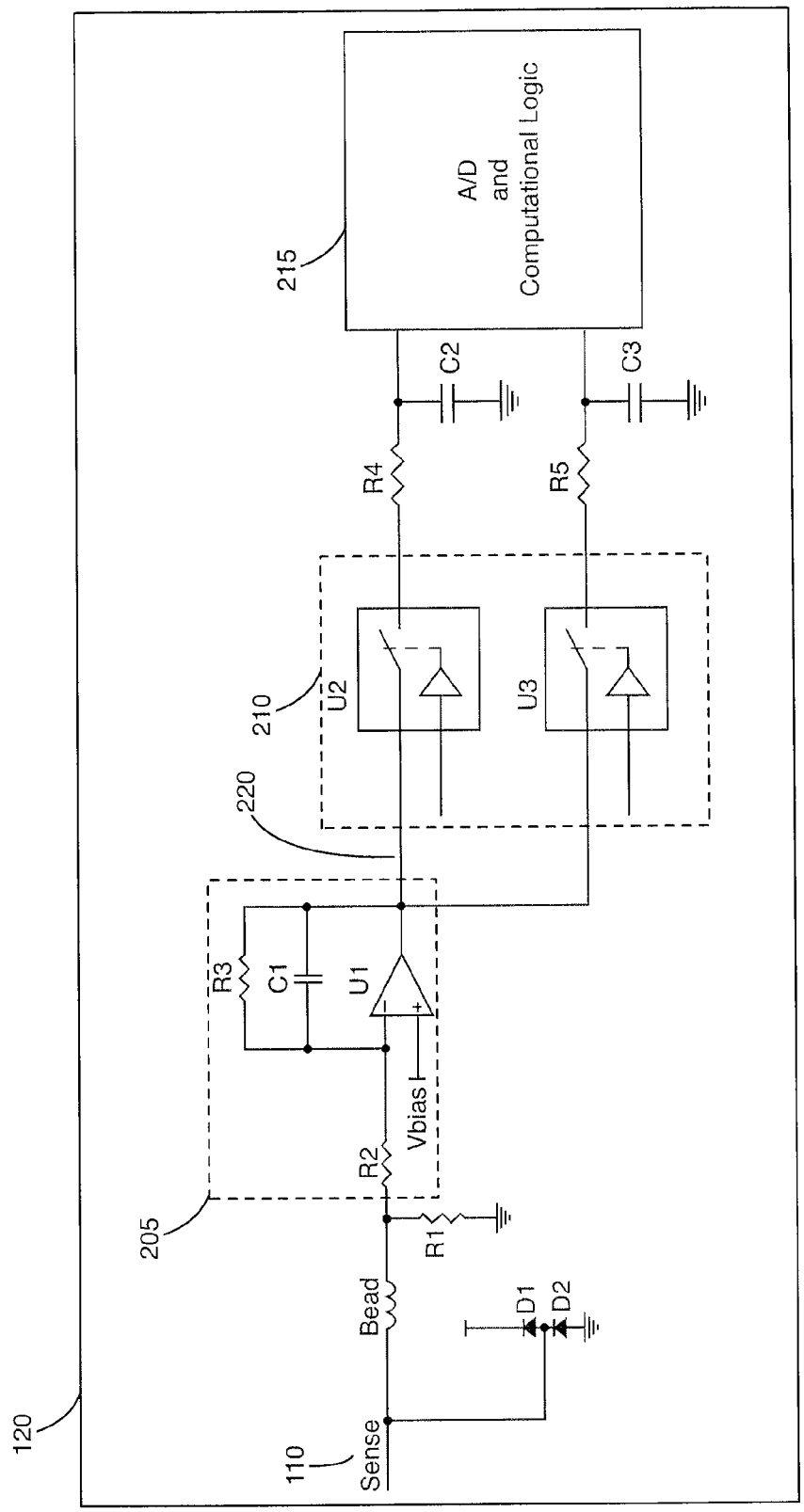
FIG. 2 illustrates an exemplary schematic of a sense circuit that may be utilized in connection with sense electrodes illustrated in FIG. 1.

FIG. 2 illustrates an exemplary schematic of a sense circuit 120 that may be utilized in connection with the sense electrodes 110, described above. The sense circuit 120 includes an integrator circuit 205, followed by a switching circuit 210, and a processing circuit 215. The integrator circuit 205 includes a gain element configured as an integrator circuit with resistor R3 and capacitor C1 in the feedback loop. In the exemplary schematic, the sense electrode 110 is coupled to the input of the integrator circuit. In some implementations, all or some of the sense electrodes 110 may be multiplexed into a single sense circuit 120. Alternatively, a sense circuit 120 may be provided for each sense electrode 110. The output signal 220 of the integrator circuit corresponds to an integrated version of the signal received from the sense electrode 110.

The switch circuit 210 is coupled to the output of the integrator circuit 205. The switch circuit 210 is configured to periodically couple the output of the integrator circuit 205 to an input of the processing circuit 215 to facilitate sampling of the output signal 220 of the integrator circuit 200, as described in more detail below.

The processing circuit 215 may include an analog-to-digital converter (ADC) configured to convert the sampled output signal generated from the integrator circuit 205 into a digital signal. In some implementations, where more than one sense circuit 120 is provided, each sense circuit 120 may include a single ADC. In alternative implementations, the sampled outputs of multiple integrators may be multiplexed together and fed into a single ADC. In yet other implementations, different ADCs may be utilized to measure, for example, a high sample value and a low sample value. Other configurations are possible.

The processing circuit 215 may also include computational logic for performing calculations on the digitized sample signal. For example, the computational logic may include logic for computing a difference between pairs of samples of the output signal 220, computing an average value of the samples of the output signal 220, digitally filtering noise, and/or performing other digital signal processing functions. For example, a 1-2-1 digital filter of interest for eliminating offset drifts due to low frequency electromagnetic interference or incomplete settling of RC time constant may be used in combination with other filters. Within an arbitrary scaling constant, the 1-2-1 filter replaces high sample values with twice the high sample value minus the two neighboring low sample values and replacing the low value samples similarly with the roles of low and high value samples reversed. The results of the computations are utilized in subsequent processing circuits/operations to determine whether a touch has occurred at a given intersection of a drive electrode and a sense electrode.

FIG. 2 also illustrates a number of details that can be varied without departing from the basic concepts of the design. For example, the diodes D1 and D2 protect the downstream circuitry from over voltage transients such as electrostatic discharges. The inductor labeled "Bead" blocks high frequency electromagnetic interference and has little effect on the desired signal. Resistors R1, R2 and R3 provide for appropriate and stable bias voltages while having little effect on the current integrating function of amplifier U1 and capacitor C1. The resistors R4 and R5 associated with sample-and-hold capacitors C2 and C3 contribute to RC low pass filtering to stabilize the voltages passed on to the analog-to-digital converter(s) in processing circuit 215. Switch circuit 210, as well as resistors R4 and R5 and capacitors C2 and C3, may well be combined with or built into other circuit elements such as processing circuit 215. Furthermore, some or all the circuit elements of FIG. 2 may be integrated into one or more silicon chips. Each of these circuit details may be varied without departing from the basic approach of measuring a mutual capacitance with continuous connection of a sense electrode 110 to an integrator circuit 205 providing high sample and low sample values for analog-to-digital conversion of a processing circuit 215.

Figure 3:
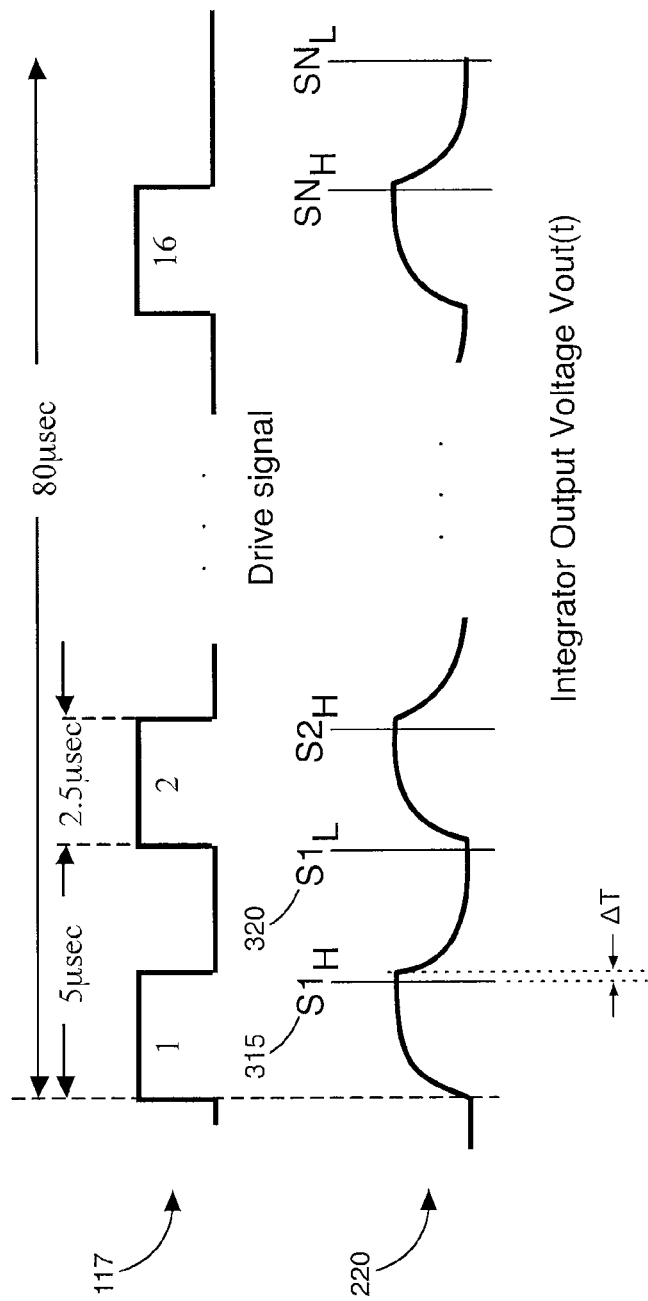
FIG. 3 illustrates the relationship between a square wave pulse that drives drive electrodes illustrated in FIG. 1 and an output signal of an integrator circuit.

FIG. 3 illustrates the relationship between a square wave drive pulse 117 that drives the drive electrodes and the output signal 220 of the integrator circuit 200. The output signal 220 corresponds to an integrated version of the square wave drive pulse 117. For each cycle of the square wave drive pulse 117, the switch circuit 210 is configured to momentarily close at sample times $S1_H$ 315 and $S1_L$ 320 to facilitate sampling the maximum and minimum values of the output signal 220. The samples are taken just prior to the falling and rising edges of the square wave drive pulse 305, respectively. For example, the samples may occur at a time, ΔT, of about 1 μS or less before a respective edge. The ADC of the processing circuit 215 converts the sample to digital data.

In operation, the processing circuit 215 computes the difference between the high sample value ($S1_H$ 315) and the low sample value ($S1_L$ 320). The magnitude of the difference between the two values is proportional to the mutual capacitance at the intersection between a given drive electrode and sense electrode. In some implementations, the determination of the mutual capacitance may be obtained from a single maximum/minimum cycle and may be obtained in as little as 1 μs to 10 μs per value. The reason for this is that the difference between maximum and minimum sample values is generally immune to common mode backgrounds at low frequency relative to the drive frequency, as explained further below.

While it is possible to determine a mutual capacitance based on the measurement of a single high/low sample pair (315, 320), in some implementations a number of cycles are measured to refine the accuracy of the measurement further. For example, measurements from sixteen cycles may be averaged to refine the accuracy of the measurement and further reduce the effects of noise. Of course, it is understood that the number of samples measured may be increased or decreased as needed based on the required accuracy of the measurement.

As noted above, an advantage to sampling both the maximum and minimum value of the signal is that it provides important noise suppression, particularly for noise sources or other interference at frequencies that are low compared to the drive frequency. This is illustrated via the following: Consider the effects of a DC offset at the integrator output so that the sampled and digitized maximum and minimum signals of FIG. 3 are modified from $\{S1_H, S1_L, S2_H \ldots SN_H, SN_L\}$ to $\{S1_H$+Offset, $S1_L$+Offset, $S2_H$+Offset $\ldots SN^H$+Offset, $SN_L$+Offset$\}$. A subsequent digital signal processing step may be to compute differences $\{(S1_H-S1_L), (S2_H-S2_L), \ldots (SN_H-SH_L)\}$ in which the offsets drop out and then pass this difference sequence of values through a signal averaging filter.

A similar approach is to flip the sign of every other digitized value (e.g., every minimum value) to produce the sequence of values $\{S1_H, -S1_L, S2_H, -S2_L, \ldots SN_H, -SN_L\}$ and then applying an averaging filter to this sequence. In the presence of a DC offset, this alternating-sign-flipped sequence is modified to $\{S1_H$+Offset, $-S1_L$-Offset, $S2_H$+Offset, $-S2_L$-Offset, $\ldots SN_H$+Offset, $-SN_L$-Offset$\}$, of which the background or noise component is the oscillating sequence $\{$+Offset, −Offset, +Offset, $\ldots$ +Offset, −Offset$\}$ of a frequency equal to the driving frequency. Transformed to oscillate at the driving frequency, the offset is easily eliminated with many types of averaging or low-pass filter such as the 1-2-1 filter described above.

As shown in FIG. 3, the desired signal values $\{S1_H, S1_L, S_H \ldots SN_H, SN_L\}$ oscillate in sync with the driving frequency while the offset, namely $\{$Offset, Offset, Offset, $\ldots$ Offset, Offset$\}$ is a zero frequency background. Hence the digitized signals $\{S1_H$+Offset, $S1_L$+Offset, $S2_H$+Offset $\ldots SN_H$+Offset, $SN_L$+Offset$\}$ contain a mixture of the desired signal at the drive frequency and the undesired offset at zero frequency. By multiplying or "mixing" the digitized signals with an oscillation at the drive frequency, namely +1, −1, +1, $\ldots$ +1, −1, we obtain a mixed or heterodyned signal sequence $\{S1_H$+Offset, $-S1_L$-Offset, $S2_H$+Offset, $-S2_L$-Offset, $SN_H$+Offset, $-SN_L$-Offset$\}$ in which the desired signal has been shifted from the drive frequency to a baseband frequency and the background offset has been shifted from zero frequency to the drive frequency, thus making it easy for a low-pass filter to reject the offset and pull out the desired signal. As becomes clear from the principles of heterodyning, the circuit in FIG. 2 with the maximum/minimum value sampling strategy of FIG. 3 will strongly suppress "offsets" even if the "offset" is not strictly zero frequency DC, but rather any noise or background that varies with time slowly relative to the drive frequency.

While various embodiments of the embodiments have been described, it will be apparent to those of ordinary skill in the art that many more embodiments and implementations are possible that are within the scope of the claims. Accordingly, it will be apparent to those of ordinary skill in the art that many more embodiments and implementations are possible that are within the scope of the claims. Therefore, the embodiments described are only provided to aid in understanding the claims and do not limit the scope of the claims.

What is claimed is:

1. A circuit for measuring a mutual capacitance between electrodes disposed on a substrate, comprising:
    a drive circuit configured to generate a periodic pulse and to communicate the pulse to a drive electrode; and
    a sense circuit configured to measure a mutual capacitance between the drive electrode and a sense electrode at a point of intersection between the drive electrode and the sense electrode, wherein the sense circuit comprises:
        an integrator circuit with an input section that is in continuous electrical communication with the sense electrode for an amount of time required for measuring the mutual capacitance;
        a switch circuit with an input in electrical communication with an output of the integrator circuit and an output in electrical communication with a analog-to-digital converter, wherein the switch operates to momentarily communicate an output signal of the integrator circuit to the analog-to-digital converter at a first time that is prior to a falling edge of the pulse, and at a second time that is prior to a rising edge of the pulse to thereby sample a maximum value and a minimum value of the output signal; and
        computational logic configured to determine a difference between the maximum value and the minimum value to thereby determine a mutual capacitance between the drive electrode and the sense electrode.

2. The circuit of claim 1, further comprising averaging the difference between the maximum value and the minimum value for a plurality of pulses.

3. The circuit of claim 2, wherein the average is a weighted average.

4. The circuit of claim 3, wherein the weighted average is obtained via a 1-2-1 filter that filters the maximum value and the minimum value of the plurality of pulses.

5. The circuit of claim 2, wherein for each intersection of a sense electrode and a drive electrode, sixteen or fewer pairs of maximum values and minimum values are measured to determine a mutual capacitance at the intersection.

6. The circuit of claim 1, wherein a frequency of the pulse is between about 50 kHz and 500 kHz.

7. The circuit of claim 1, further comprising a plurality of sense circuits, each being configured to measure a mutual capacitance between one or more drive electrodes and sense electrodes.

8. The circuit of claim 7, wherein each sense electrode is coupled to a different sense circuit.

9. A method for measuring a mutual capacitance between electrodes disposed on a substrate, comprising:
- generating a periodic pulse;
- communicating the pulse to a drive electrode; and
- measuring a mutual capacitance between the drive electrode and a sense electrode at a point of intersection between the drive electrode and the sense electrode, wherein measuring further comprises:
- continuously integrating a sense signal from the sense electrode during a time required for determining the mutual capacitance to thereby generate an integrated sense signal;
- periodically sampling the integrated sense signal at a first time that is just prior to a falling edge of the pulse, and at a second time that is just prior to a rising edge of the pulse to thereby sample a maximum value and a minimum value of the integrated sense signal;
- digitizing the maximum value and the minimum value; and
- determining a difference between the maximum value and the minimum value to thereby determine a mutual capacitance between the drive electrode and the sense electrode.

10. The method of claim 9, further comprising averaging the difference between the maximum value and the minimum value for a plurality of pulses.

11. The method of claim 10, wherein the average is a weighted average.

12. The method of claim 11, further comprising filtering the maximum value and the minimum value of the plurality of pulses with a 1-2-1 filter to obtain the weighted average.

13. The method of claim 9, wherein a frequency of the pulse is between about 50 kHz and 500 kHz.

14. A touch sensitive system, comprising:
- a substrate having disposed thereon a plurality of drive electrodes and a plurality of sense electrodes; and
- a circuit for determining a location of a touch, the circuit comprising:
  - a drive circuit configured to generate a periodic pulse and to communicate the pulse to a drive electrode; and
  - a sense circuit configured to measure a mutual capacitance between the drive electrode and a sense electrode at a point of intersection between the drive electrode and the sense electrode, wherein the sense circuit comprises:
    - an integrator circuit with an input section that is in continuous electrical communication with the sense electrode;
    - a switch circuit with an input in electrical communication with an output of the integrator circuit and an output in electrical communication with an analog-to-digital converter, wherein the switch operates to momentarily communicate an output signal of the integrator circuit to the analog-to-digital at a first time that is prior to a falling edge of the pulse, and at a second time that is prior to a rising edge of the pulse to thereby sample a maximum value and a minimum value of the output signal; and
    - computational logic configured to determine a difference between the maximum value and the minimum value to thereby determine a mutual capacitance between the drive electrode and the sense electrode.

15. The touch sensitive system of claim 14, further comprising averaging the difference between the maximum value and the minimum value for a plurality of pulses.

16. The touch sensitive system of claim 15, wherein the average is a weighted average.

17. The touch sensitive system of claim 16, wherein the weighted average is obtained via a 1-2-1 filter that filters the maximum value and the minimum value of the plurality of pulses.

18. The touch sensitive system of claim 14, wherein a frequency of the pulse is about between about 50 kHz and 500 kHz.

19. The touch sensitive system of claim 14, further comprising a plurality of sense circuits, each being configured to measure a mutual capacitance between one or more drive electrodes and sense electrodes.

20. The touch sensitive system of claim 19, wherein each sense electrode is coupled to a different sense circuit.

* * * * *